US011138720B2

(12) United States Patent
Wenzel et al.

(10) Patent No.: US 11,138,720 B2
(45) Date of Patent: Oct. 5, 2021

(54) METHOD FOR RECOGNIZING THE GEOMETRY OF A PORTION OF AN OBJECT

(71) Applicant: Volume Graphics GmbH, Heidelberg (DE)

(72) Inventors: Nicolas Wenzel, Heidelberg (DE); Dzmitry Razmyslovich, Heidelberg (DE); Markus Rhein, Heidelberg (DE)

(73) Assignee: Volume Graphics GmbH, Heidelberg (DE)

(*) Notice: Subject to any disclaimer, the term of this patent is extended or adjusted under 35 U.S.C. 154(b) by 0 days.

(21) Appl. No.: 16/649,594

(22) PCT Filed: Sep. 11, 2018

(86) PCT No.: PCT/EP2018/074442
§ 371 (c)(1),
(2) Date: Mar. 20, 2020

(87) PCT Pub. No.: WO2019/057549
PCT Pub. Date: Mar. 28, 2019

(65) Prior Publication Data
US 2020/0388026 A1    Dec. 10, 2020

(30) Foreign Application Priority Data
Sep. 22, 2017   (DE) .................... 10 2017 122 063.1

(51) Int. Cl.
*G06T 5/00* (2006.01)
*G06T 7/00* (2017.01)
(Continued)

(52) U.S. Cl.
CPC .............. *G06T 7/0006* (2013.01); *G06F 3/14* (2013.01); *G06T 7/60* (2013.01); *G06T 2207/20101* (2013.01); *G06T 2207/30164* (2013.01)

(58) Field of Classification Search
CPC . G01N 21/8806; G06T 7/0004; G06T 7/0006; G01S 7/4817; G01S 7/4811;
(Continued)

(56) References Cited

U.S. PATENT DOCUMENTS 4,490,848 A * 12/1984 Beall .......................... G06T 9/20
382/152
2014/0237386 A1* 8/2014 Barrington .............. G06F 16/50
715/753

FOREIGN PATENT DOCUMENTS

DE    199 14 862 A1    10/2000
DE    102 03 018 A1    11/2003
(Continued)

OTHER PUBLICATIONS

European Patent Office/ISA International Search Report and Written Opinion for PCT Application No. PCT/EP2018/074442, dated Nov. 19, 2019.
(Continued)

*Primary Examiner* — Phuoc H Doan
(74) *Attorney, Agent, or Firm* — SoCal IP Law Group LLP; Angelo Gaz (57) ABSTRACT

Described is a computer-implemented method for recognizing the geometry of a portion of an object in a digital representation of the object having a plurality of image points representing at least one material interface of the object. The method comprises determining and displaying the object representation, receiving a user input specifying a first position in the object representation as a starting point, determining a first set of image points in the vicinity of the starting point representing the geometry of the portion of the starting point, determining a checking geometry on the basis of the first set of image points by adapting at least one geometry element to the first set of image points, determining a second set of image points in the vicinity of the starting
(Continued)

point representing the geometry of the portion of the checking geometry, inserting the second set of image points into and displaying a target set of image points.

11 Claims, 1 Drawing Sheet

(51) Int. Cl.
*G06F 3/14* (2006.01)
*G06T 7/60* (2017.01)

(58) Field of Classification Search
CPC ... G01S 7/484; H04L 65/403; G02B 27/0172; G06F 1/163; G06F 3/14
See application file for complete search history.

(56) References Cited

FOREIGN PATENT DOCUMENTS

| DE | 10 2005 058 700 A1 | 12/2006 |
|---|---|---|
| DE | 10 2005 058 701 A1 | 12/2006 |
| DE | 10 2007 044 000 A1 | 4/2009 |
| DE | 10 2010 020 735 | 11/2011 |

OTHER PUBLICATIONS

Kroll, Julia et al. "New Solutions for Industrial Inspection Based on 3D computer tomography" Optical and Digital Image Processing, vol. 7000, No. 7000006, Jan. 1, 2008, pp. 1-12.

Ahn, S.J. et al. "Automatic segmentation and model identification in unordered 3D-point cloud", Visual Communication and Image Processing; San Jose, vol. 4902, Jan. 1, 2002, pp. 723-733.

German Patent Office, Office Action for German Patent Application No. 10 2017 122 063.1, dated May 17, 2018.

European Patent Office, Office Action for European Patent Application No. 18769145.6, dated Mar. 19, 2021.

\* cited by examiner

METHOD FOR RECOGNIZING THE GEOMETRY OF A PORTION OF AN OBJECT

RELATED APPLICATION INFORMATION

This patent claims priority from International PCT Patent Application No. PCT/EP2018/074442, filed Sep. 11, 2018 entitled, "METHOD FOR RECOGNIZING THE GEOMETRY OF A PORTION OF AN OBJECT", which claims priority to German Patent Application No. 10 2017 122 063.1, filed Sep. 22, 2017 all of which are incorporated herein by reference in their entirety.

The invention relates to a computer-implemented method for identifying a geometry of a portion of an object.

Dimensional metrology generally deals with the task of ascertaining properties, such as dimensions of certain partial geometries of an object, from a digital representation of the object. To this end, the segmentation of the digital representation of the object such that the image points of the digital representation belonging in each case to a partial geometry can be grouped is known from the prior art. The corresponding dimensions of the geometry can then be ascertained from the segmentations of the object representation obtained in this way by fitting a reference geometry. By way of example, for an object that has a large number of bores, edges, extrusions or other geometries, the dimensions of these geometries and whether the corresponding dimensions correspond to a specification that had to be taken into account when the object was produced can be determined exactly in this way. By way of example, this can realize a workpiece inspection by means of a tomographic or optical measurement of a workpiece and a subsequent evaluation of the digital object representation obtained.

In order to identify partial geometries of an object, the prior art has disclosed the practice of, for example, a user selecting a set of points of the digital representation of the object via an interface. Further, the user can set the basic geometry, i.e., whether a cylinder, a surface, a curve or any other shape is present. The selected basic shape is then fitted to the points selected by the user and an analysis of the corresponding properties of the object is carried out on the basis of the fitted basic shape.

However, this approach is disadvantageous in that a multiplicity of user interactions are required to obtain a satisfactory result. Thus, the user has to specify the basic geometry and the points to be used for the fitting process. In the process, the user will usually only define a small subset of all points that actually represent the geometry to be measured. Consequently, sufficient statistics are often not available on account of the small number of measurement data, and so a measurement result is associated with a comparatively large error. Further, a user will usually not always select the same points in two successive analysis processes, and so the analysis is not reproducible either.

By contrast, the present application is based on the object of developing a computer-implemented method for identifying a geometry of a portion of an object, which overcomes the aforementioned disadvantages of the prior art.

The main features of the invention are set out herein.

In a first aspect, the invention relates to a computer-implemented method for identifying a geometry of a portion of an object in a digital representation of the object, the digital representation having a multiplicity of image points. The image points of the digital representation represent at least one material interface of the object. The method includes the steps described below.

First, the object representation is ascertained and displayed on at least one display means. Subsequently, at least one first user input is received, the user input specifying at least one first position in the object representation as a starting point. Then, a first set of image points is ascertained in the surroundings of the starting point, the first set of image points representing the geometry of the portion in the region of the starting point.

A test geometry is ascertained on the basis of the image points of the first set of image points by virtue of fitting at least one geometric element to the image points of the first set of image points. Subsequently, a second set of image points in the surroundings of the starting point is ascertained, the second set of image points representing the geometry of the portion in the region of the test geometry. The second set of image points is then inserted into at least one target set of image points and the image points of the target set of image points are displayed in the object representation on the at least one display means.

Subsequently, a second user input is received, which indicates whether the displayed image points correctly reproduce the geometry of the portion of the object. Should the second user input indicate that the geometry is correctly reproduced, at least one dimension of the geometry is determined and the dimension is output. By contrast, should the second user input indicate that the geometry is not reproduced correctly, the previous steps which led to the ascertainment of the first and second set of image points and the ascertainment of the test geometry are repeated. The dimension can be output both visually and in the form of the output of an appropriate file.

An advantage of the method described above is that, in the ideal case, simply setting a starting point by a user, for example by selecting a point in a representation of the object on a display means such as a computer monitor, leads to the geometry of a portion being already determined completely correctly.

To this end, a set of image points is initially ascertained proceeding from a starting point, said set describing the geometry of the portion in the immediate surroundings of the starting point. The position in the object representation selected by a user, which is used as the starting point below, can be identical to one of the image points of the object representation. However, a user could also select a position between the existing image points. In this case, an interpolation can be carried out over the image points adjacent to the selected position for the purposes of ascertaining the local parameters of the material interface of the displayed object. Alternatively, if a position that does not correspond to an existing image point is selected, the user input can be interpreted in such a way that the image points closest to the position is taken as the starting point.

On the basis of the set of image points obtained in this way, a test geometry can then be ascertained, said test geometry probably correctly describing the geometry of the portion of the object within which the starting point is located. To this end, standard geometries such as circles, lines, planes, spheres, tori, cylinders, cones or the like are preferably fitted, as geometric elements, to the image points of the target set in such a way that the best possible correspondence between the geometric elements and the image points is obtained. Further, fitting of free-form lines and/or free-form surfaces can also be provided. By way of example, a fit method can be used to this end, such as the least squares method according to Gauss or a Chebyshev fit. When fitting a geometric element to the image points of the target set, it is not mandatory for all the image points of the target set to be taken into account. Rather, a representative subset of image points can be selected from the target set in advance, said image points being disposed equidistantly from one another, for example.

The test geometry ascertained in this way is then used to determine further image points, which probably also belong to the portion or the geometry of the portion which should be selected by the user input.

The set of image points ascertained thus can then be displayed to a user via a display means, such as a monitor, for example. By way of example, provision can be made for the image points that were selected during the course of the method to be colored in the object representation. According to one embodiment, the user can also be shown, in addition to the ascertained image points, what geometric element has been fitted to the image points. A user can then easily identify whether the correct image points have been ascertained by the algorithm such that the geometry was probably identified correctly. At this point, the user has the option of confirming that the image points have been ascertained correctly. In this case, a precise fit of the geometric element to the ascertained image points can then take place and dimensions of the geometry can be ascertained and output from the result.

By contrast, should a user identify that incorrect image points or not all relevant image points have been ascertained by the program, the user can inform the program of this by way of an appropriate input, and so the algorithm for ascertaining the image points is run through again.

In addition to the output of the ascertained dimensions and the further quantities ascertained during the method, such as the geometric element used, its final position and orientation and the values and tolerance intervals of the parameters taken into account, these values can also be stored in a corresponding data memory. The values ascertained thus can then be used, for example, to create an automatic test plan for further measurements on objects of the same type or of the same nominal geometry. To this end, the ascertained information can preferably also be exported from the data processing system used.

The initial ascertainment of the object representation can be implemented both by measuring the object and by reading a storage medium in which the object representation is stored. The measurement can be, for example, a computed tomographic measurement, an optical measurement, for example using a laser scanner, a measurement using a fringe projection or a tactile measurement. In general, any measurement method which outputs data that can be used to ascertain material interfaces and, in particular, surfaces of an examined object is suitable.

According to one embodiment, provision is made for the ascertainment of the first set of image points to include the ascertainment of at least one first parameter of the material interface at the location of the starting point, the respective first parameters of the material interface at the positions of the image points of the first set of image points corresponding to the at least one first parameter at the location of the first image point.

By way of example, the first parameter can be a curvature value that indicates how strongly a material interface of the displayed object is curved at the position represented by the image point. In addition to a curvature, use can also be made of any other parameter which is suitable for characterizing a surface represented by the image points. If further image points with a comparable associated curvature are ascertained in the immediate surroundings of this starting point, it is possible to assume that these image points belong to the same geometry as the image point selected by the user input. The aforementioned "correspondence" of parameters is given when the parameters of the further image points found are within a defined value interval around the parameter of the starting point. The values for the first parameter and the corresponding value or tolerance interval can be continuously recalculated or adjusted taking into account the image points already found.

Further, according to a further embodiment, provision is made for the ascertainment of the second set of image points to include the ascertainment of reference values of at least one second parameter for image points in the surroundings of the test geometry, the respective second parameters of the image points of the second set of image points corresponding to the ascertained reference values.

To this end, a further parameter is selected and reference values for further image points which can be used to ascertain the test geometry are ascertained. By way of example, such reference values can be the position of the image points relative to the surface specified by the test geometry or the deviation of the direction of a normal on the surface of the test geometry in relation to the surface normal of the material interface of the object. Using the further second parameter, further image points can then be determined and assigned to the target set should these correspond to the reference values, taking into account an error tolerance. When ascertaining further points, the parameter previously used to ascertain the first set of image points, such as a surface curvature, can also be used again. By way of example, when ascertaining the second set of image points, use can be made of the surface curvature, the relative directional deviation of a surface normal of the test geometry from the material interface, and the deviation of image points from the test geometry.

The tolerances or value intervals described above, which are used in the ascertainment of image points, can be, e.g., statistical measures which are derived from the previously ascertained image points. By way of example, if the surface curvature is used as a parameter, a mean value of the curvatures and the corresponding standard deviation can be ascertained from the curvatures of the material interface at the previously ascertained image points. The standard deviation, or n times the standard deviation, can then be used as an error tolerance when selecting further image points. In a similar manner, for the position of a image point relative to the surface of the test geometry, the mean square deviation of the position of image points from the test geometry can be used to set the tolerance range. By contrast, should the directional deviation of a surface normal of the test geometry from the surface normal of the material interface of the component at the position of a image point be used as a parameter, a heuristic value can be used as the tolerance range, for example 20 degrees.

As already explained above, the second user input can indicate that the image points of the target set displayed in the object representation do not correctly reproduce the geometry. To indicate this, provision is made according to one embodiment for the second user input to specify at least one further image point as the starting point. To this end, provision could be made in a simple implementation for the selection of a further starting point by the user to automatically lead to the ascertainment of the image points for the target set of image points being restarted. In this case, the initial ascertainment of the first set of image points can take place starting from all starting points that were previously selected by a user. In this way, further information relating to the geometric element actually to be ascertained is introduced for the implementation of the algorithm and the determination of image points, which usually lead to a more precise result. Here, a user can specify any number of starting points should they consider this necessary on account of the displayed ascertained image points of the target set. In the case where the second user input defines a further position as the starting point, the reception of a first user input, which likewise defines a position in the object representation as a starting point, can be dispensed with in the further iteration of the method.

According to a further embodiment, the second user input can further set a geometric element in order to indicate that the geometry was not correctly reproduced. In this case, only the geometric element set by the second user input is taken into account in the subsequent ascertainment of the test geometry. The selection of a geometric element by a user can be implemented, for example, by virtue of the possible geometric elements for a fit being displayed, for example in the form of a pop-up window, in addition to the ascertained image points of the target set. Knowing the actual geometry of the displayed object, the user can then select an appropriate geometric element. By setting the geometric element, a source of error in the further determination of image points of the target set is precluded, and so a more precise determination of the geometry and consequently of the dimensions of the object, too, is possible.

In order to be able to present the user with a result that is as precise as possible already following one iteration of the algorithm, a further embodiment provides for the ascertainment of the test geometry, the ascertainment of reference values of the second parameter, the ascertainment of the second set of image points and the insertion of the ascertained image points of the second set of image points into the target set of image points to be carried out multiple times in iterative fashion within one iteration of the method steps. This means that multiple image points are ascertained on the basis of a fitted geometry within a single iteration of the method before the image points are displayed to a user. The image points ascertained in a previous iteration step are used in this case to carry out a new fit of the previously determined geometric element. A subsequent iteration is preferably always carried out on the basis of the geometric element that was already ascertained in a previous iteration step and used to determine the further image points.

On the basis of the test geometry ascertained in this way, image points which can be incorporated, in turn, into the refinement of the test geometry are then ascertained again. In this case, new intended values and tolerance intervals for the parameters to be determined can also be ascertained in each iteration on the basis of the newly ascertained image points. By way of example, this iteration can be repeated until the target set of image points converges, i.e., only a few further image points which can be added to the target set on the basis of the specified criteria are ascertained. Alternatively, a defined number of iterations can be stipulated, for example by a further user input. The iterative determination of image points and test geometries is advantageous in that, in the ideal case, all relevant image points have already been captured already after a single iteration of the method, and so no new user input is necessary. In this way, the efficiency of the method described can be improved.

According to one embodiment, another option for increasing the efficiency of the method or reducing the computational outlay required consists in terminating the ascertainment of the first set of image points as soon as the number of image points in the first set of image points reaches a predefined number of image points. For example, it may be stipulated here that the determination of the first set of image points is terminated as soon as 300 image points have been ascertained. In this way, the duration of the procedure and the computational outlay can be reduced. The choice of the number of image points above which no further image points are ascertained is preferably made in such a way that there is a sufficient number of measurement points to be able to ascertain a first test geometry. At this point, a greater number of image points does not yet make a substantial contribution to the accuracy of the ascertainment of image points, since only a single parameter is tested when ascertaining the first set of image points, without taking into account a possible shape of a geometric element.

In this case, the image points required until the above-described set of image points is obtained are preferably distributed uniformly among the existing starting points. By way of example, it may be stipulated here that a maximum of 300 image points are ascertained in the course of ascertaining the first set of image points. If three starting points have been defined for ascertaining the first set of image points, exactly 100 image points are ascertained around each of these starting points before the ascertainment of the image points is terminated. Accordingly, exactly 150 image points would be assigned to each of the starting points in the case of two starting points. This procedure is advantageous in that even very small geometries, such as a rounded transition between two planes, which can be considered to be a cylinder locally, can be well-delimited by selecting a plurality of starting points. If a large number of image points were ascertained for each starting point in this case, there would be the risk of accidentally also taking into account image points of the adjacent planes, which actually do not belong to the geometry to be examined. This would falsify the final measurement result and lead to misinterpretations.

According to a further embodiment, the ascertainment of the test geometry includes the steps described below:

First, a geometric element is ascertained. Subsequently, the ascertained geometric element is fitted to the image points of the target set of image points by applying a fit method and at least one deviation of the fitted geometric element from the image points of the target set of image points is ascertained. This sequence of steps is repeated for at least two geometric elements. Finally, the fitted geometric element with the smallest ascertained deviation is then set as the test geometry. In this way, a large number of geometric elements can be checked automatically against the ascertained image points, the method automatically selecting the fitted geometric element that most likely matches the ascertained image points of the target set of image points. This has the effect of further improving the degree of automation of the method and hence its efficiency because, in the ideal case, no further user interaction is required to select a basic geometry.

The geometric elements can be read from, e.g., a storage medium of the computer system on which the method according to the invention is implemented. Any fit method, such as the least squares method according to Gauss or a Chebyshev fit, can be used to fit the geometric elements to the image points of the target set of image points. As already explained above, it is not a requirement to use all of the image points of the target set when fitting the geometric elements.

The geometric elements taken into account in the ascertainment of the test geometry can depend on the previously made user input, to the extent that, for example, two-dimensional geometric elements are only taken into account if all starting points specified by a user input are located within a common plane. According to one embodiment, provision can be further made for a slice of the object representation to be initially defined within the course of the first user input by a user and for starting points to then only be defined in this slice. In this case, only two-dimensional geometric elements could initially be checked in the slice. If the user subsequently specifies further starting points outside of the slice, the ascertainment of the test geometry is extended to three-dimensional geometric elements. The previously ascertained image points can still be taken into account in this case. The computational outlay can be further reduced by such a pre-selection of the geometric elements since the number of possible variables is reduced. Furthermore, ambiguity with regard to the question of whether a two-dimensional or a three-dimensional geometric element should be fitted can be avoided. What may happen in some cases is that it proves impossible to differentiate, on the basis of the chosen starting points, whether only a circle should be fitted as a geometric element or a cylinder. The defined selection of a slice only renders carrying out measurements in a specific, clearly defined plane of the object in a targeted manner possible.

The above-described testing of different geometric elements is naturally unnecessary and not carried out either according to the invention if a geometric element has already been set by the second user input, as described above.

According to a further embodiment, the above-described ascertainment of the deviation of the fitted geometric element can be carried out as described below:

Initially, the mean square distance of the fitted geometric element is ascertained from the target set of image points as position error. Further, the mean square sine of the angle difference between the respective normal vectors of the fitted intended geometry and the target set of image points is ascertained as directional error. The corresponding product is then ascertained from the previously ascertained position error and the directional error, the ascertained product then being weighted with a defined weighting factor which depends on the respective geometric element. The product weighted in this way is then defined as the deviation of the fitted geometric element.

The weighting factors are preferably a heuristic factor, which is generally determined by a geometric element. By way of example, a different weighting factor can be assigned to the "sphere" geometric element than the "cylinder" geometric element.

The above-described determination of a deviation of an fitted geometric element from the image points of a target set of image points is particularly robust against noise in the information of the image points usually present in a digital representation of an object.

According to a further embodiment, the efficiency of the method according to the invention can be increased further by virtue of image points from the target set of image points being selectively deleted after inserting the image points of the second set of image points into the target set of image points such that the image points remaining in the target set of image points are distributed uniformly, more particularly equidistantly in a regular grid in space. Here, provision can also be made for the image points of the target set to be checked again within the scope of resampling using information that has now been refined in order to find out whether the parameters of the image points continue to correspond to the conditions given by the corresponding intended values and tolerance intervals. Within the scope of the resampling, further, previously unconsidered points can also be included in the target set, provided that these correspond to the respective requirements in respect of their parameters. In this way, the computational outlay of the method can be reduced on account of a reduced number of data points to be taken into account, without having to accept a substantial loss of information or accuracy of the method. Thus, the additional image points of a locally higher density distribution of the image points do not contribute substantially to the accuracy of the fit of the geometric element, but under certain circumstances substantially increase the computational outlay.

According to a further embodiment, the above-described method for determining the geometry of a portion of an object can also be used for determining all local geometries of an object. To this end, the surface of an object or its material interfaces, for example, can be covered with a uniform grid of starting points. The mesh size of the grid is preferably adjusted in such a way that at least one image point was defined as a starting point in each partial geometry of the object. The described ascertainment of the respective local partial geometries is subsequently carried out for all starting points found in this way. Effectively, this allows a realization of a complete measurement of a component in respect of all existing geometries within a single, fully automated process.

In a further aspect, the invention relates to a computer program product comprising instructions able to be executed on a computer, which instructions, when executed on a computer, prompt the computer to carry out the method as claimed in any one of the preceding claims.

Further features, details and advantages of the invention become apparent from the phrasing of the claims and from the following description of exemplary embodiments with reference to the drawings. In the drawings:

Figure 1:
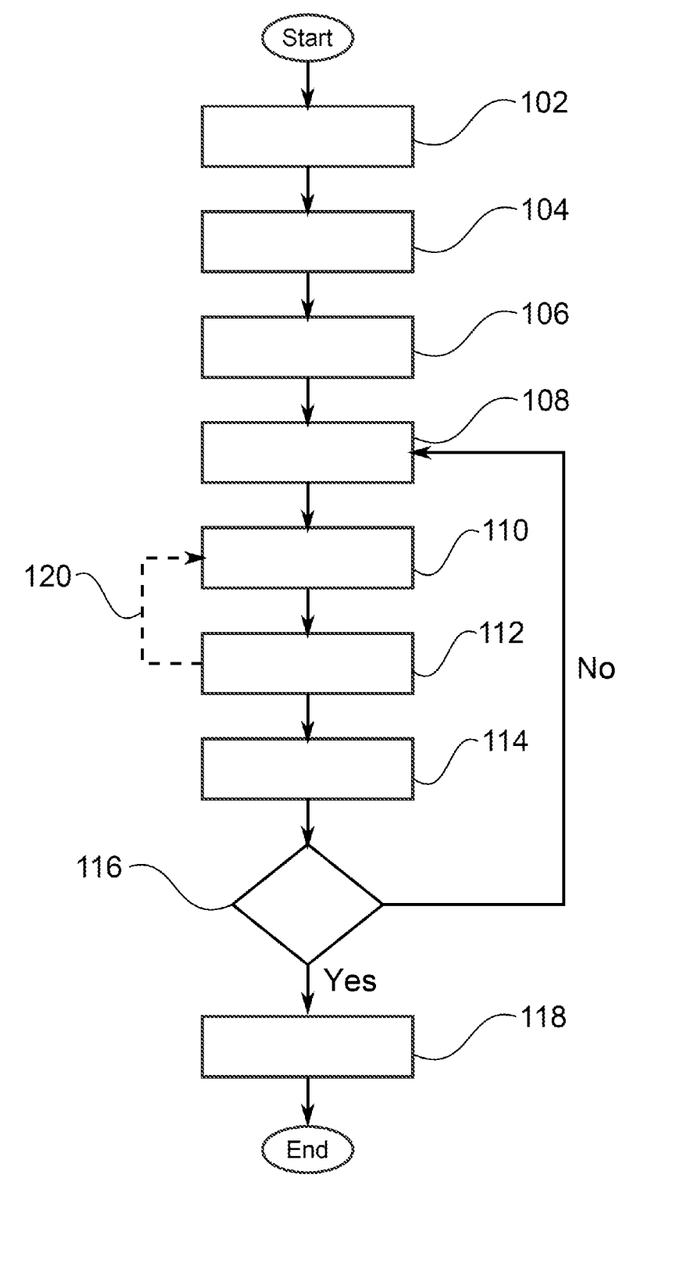
FIG. 1 shows a flowchart of an embodiment of the method.

FIG. 1 shows a flowchart of an embodiment of the method according to the invention for identifying geometries of portions in object representations. Here, the object representation is initially ascertained in a first method step 102. An object representation should be understood to mean a digital representation of an object, such as a workpiece. The material interfaces of the object are encoded in the object representation by corresponding image points, which reproduce the geometry of the object by their relative position from one another. In general, a material interface should be understood to mean any surface of an object, at the position of which there is a transition from a first material of the object to a second material. By way of example, such a material interface can describe the surface of the object since a transition from the actual material of the object, for example metal, to the ambient air occurs here and consequently the material of the object is bounded here.

However, a material interface can also be understood to mean an area in which, for example, a first material of an object, for example aluminum, is in contact with a second material of an object, for example a plastic. Such a situation exists, for example, in the case of objects that are composed of several partial workpieces, each made of different materials. By way of example, the object can be measured for the purposes of ascertaining the object representation or the object representation is read from a storage medium. By way of example, a computed tomographic examination of the object can be provided to measure an object. In particular, internal geometries of the examined object can also be ascertained in the process. However, it is possible by all means to also scan the surface of an object, for example using a laser scanner, a device for carrying out a fringe projection, or a tactile measuring device, in order thus to obtain a digital surface model of the examined object, which also represents an object representation in the sense of the present invention.

Once the object representation has been ascertained, it is displayed to a user on a display means in step 104. In general, a display means can be any means that is suitable for visualizing the object representation in such a way that it can be visually perceived by a user. By way of example, the display means can be a monitor that is connected to a computer system programmed to carry out the method. Further, the display means can also be VR glasses or the like.

A multiplicity of geometric elements can usually be identified in a visualized object representation. By way of example, the object could be an engine block. A multiplicity of bores, curved and straight surfaces, extrusions, channels and the like exist in this object. Each of these elements can be described, at least in one section, by a corresponding geometric element. Standard geometric elements, such as circles, lines, planes, spheres, tori, cylinders, cones, or also free-form lines or free-form surfaces are preferably used as geometric elements. A user can then use the visualized object representation to check, for example, whether a certain bore corresponds to the dimensions specified during manufacture.

To this end, the user can select at least one first starting point in the visualized object representation, said starting point lying on the surface of the geometry to be examined such that a corresponding first user input, which identifies at least one image point of the object representation as a starting point, is received in step 106. In a simple embodiment, the user can select a location on the surface of the displayed object, for example with a cursor. The method then includes ascertaining an image point closest to the selected location and setting this image point as the starting point.

Proceeding from this starting point, a first set of image points, which belongs to the same geometry as the starting point with high probability, is subsequently ascertained in the immediate surroundings of the starting point in method step 108. To this end, at least one first parameter of the material interface at the location of the starting point is initially ascertained. Preferably, the local curvature of the material interface at the location of the starting point is used in this case. This can already be stored in the digital object representation, or it is calculated at this location using methods known in the prior art. This local curvature then serves as the initial point for the search for further image points in the immediate surroundings.

Further, a tolerance interval is defined for the curvature value, said tolerance interval specifying the region around the ascertained curvature value in which further curvature values should still be interpreted as being "sufficiently close to the curvature value". By way of example, in order to determine the tolerance interval for the curvature, image points which are in the immediate surroundings of the starting point can be ascertained. A tolerance interval can then be ascertained from the set of image points ascertained thus, for example as n times the standard deviation of the curvatures of the image points ascertained thus. If a further image point with an assigned curvature value that is sufficiently close to the curvature value of the starting point is then ascertained in the surroundings of the starting point, this image point is included in the first set of image points. All image points that are outside the specified tolerance are ignored. During the search for further image points, the respective values for the intended curvature value and the corresponding tolerance interval can be iteratively recalculated or further adjusted on the basis of the already ascertained image points.

By choosing the tolerance interval as n times the standard deviation, an ascertainment of further points for the first set of image points can be fitted to a number of boundary conditions. By way of example, if a single standard deviation were selected as the tolerance interval, the search for further points would terminate comparatively quickly since the addition of further image points, which are within the previously ascertained standard deviation in any case, would lead to the subsequently ascertained standard deviation becoming continuously smaller. As a result, fewer and fewer image points would meet the search criteria. However, this can be counteracted by, for example, choosing a multiple of the standard deviation, for example twenty times the standard deviation, as the tolerance interval. The choice of the factor n for determining the tolerance interval can vary depending on the application.

The search for further image points for the first set of image points can be restricted, for example, to the extent of the search being terminated as soon as the number of image points in the first set of image points reaches a certain limit. By way of example, the search for image points can be terminated in step 108 as soon as 200 or 300 corresponding image points have been ascertained.

This method step is based on the consideration that image points which describe a common geometry will always be assigned an identical or at least very similar curvature value. By way of example, all image points on the surface of a bore will have a more or less equal local radius of curvature, since the radius of curvature is predetermined by the inner radius of the bore. Analogous considerations apply to the other possible geometric elements.

The image points of the first set of image points are subsequently used to ascertain a first test geometry in step 110. Here, a "test geometry" is a geometric element that is fitted to the image points of the target set, i.e., a basic geometry, the parameters of which have been adjusted in such a way that they have the greatest possible correspondence with the image points of the target set. According to a preferred embodiment, the procedure for determining such a test geometry is as follows.

Initially, a specific geometric element, for example a cylinder, is selected from a multiplicity of geometric elements, the parameters of which specific geometric element, in this case its radius and the position and orientation of the central axis, are initially still undetermined. This geometric element is then fitted to the image points of the target set by using a fit method, such as the least squares method according to Gauss or a Chebyshev fit. The result is a cylinder with a defined radius and a defined position and orientation of the central axis.

The deviation of the fitted geometric element from the image points of the target set is then ascertained for the fitted geometric element. A multiplicity of parameters can be included in the determination of the target set. Firstly, a position error and, secondly, a directional error are used according to a preferred embodiment to determine the deviation.

For the purposes of determining the position error, the mean square distance of the fitted geometric element from the image points of the target set is determined. The directional error further takes into account the difference between a surface normal of the fitted geometric element and a corresponding surface normal of the material interface of the object as per its digital representation at a corresponding image point. By way of example, the difference between the corresponding surface normals can be given by the angle between the normal directions. The directional error of the entire fitted geometry then emerges from the mean square sine of these local differences in the normal directions.

The total deviation of the fitted geometry from the image points can then be ascertained from the product of position error and directional error multiplied by a heuristic weighting factor, the weighting factor depending on the original geometric element in turn. By way of example, the weighting factor for a plane can be 0.8, while the weighting factor is 1.2 for a torus and 1.0 for a cylinder.

The previously described steps of ascertaining a geometric element, fitting the geometric element and determining the deviation of the geometric element from the image points of the target set can be repeated for a plurality of geometric elements, and so, in the end, there are respective sets of parameters and deviations for cylinder, torus, sphere, etc. Precisely the fitted geometric element with the smallest deviation from the image points of the target set is then assumed as the test geometry.

Proceeding from the test geometry ascertained thus, further image points are subsequently ascertained in step 112, which image points, taking into account the ascertained test geometry, also very likely belong to the set of points which represent the relevant area of the geometry in the object representation. Like the previously described ascertainment of the first set of image points, the at least one starting point, which was defined previously, is used again as the initial point for the ascertainment of the second set of image points.

A second set of test parameters is used to ascertain the image points of the second set of image points. By way of example, the local curvature of the surface of the displayed object can again be used to determine further image points. Additionally, a directional deviation of the surface normals and relative positional deviations can also be used, on account of the knowledge of the preliminary test geometry, for the purposes of determining further image points. Therefore, tolerance values for the corresponding test parameters are ascertained yet again on the basis of the previously known image points of the target set of image points. For the curvature, for example, the standard deviation of the curvatures for the previously ascertained image points can be used for determining the tolerance range. A heuristic value, for example 20 degrees, can be used for the directional deviation of the surface normals, while for the positional deviation from the mean positional deviation of the previously ascertained points from the test geometry or a multiple of this value can be used for the tolerance.

The use of the aforementioned statistical measures is advantageous here in that the width of the tolerance ranges ascertained accordingly is mainly defined by the image point noise. Only narrow tolerance limits are set for the selection of image points if there is only a little noise in an object representation. If these tolerance limits were also used for very noisy regions of the object representation, too few image points would be admitted to allow a reliable result to be obtained when determining the geometry. However, since the tolerance ranges scale with the strength of the noise, the described way of ascertaining further image points is very robust against noise in the object representation.

At this point, however, it is noted that the above-described options for determining tolerance intervals for ascertaining image points are only exemplary and should in no way be construed as restrictive. Rather, there are, by all means, a multiplicity of options for defining tolerance intervals for the parameters taken into account when ascertaining image points. In a very simple case, such tolerance intervals can also be set freely. Further, ascertaining the tolerance intervals from other suitable parameters of an object representation is also conceivable.

All further image points which are considered for the representation of the selected geometry, taking into account the ascertained reference values for curvature, positional deviation and direction of the surface normal, are then successively ascertained in the surroundings of the object representation. Here, according to one embodiment, provision is made for the reference values for the search parameters to be iteratively fitted to the set of image points found so far during the ascertainment of further image points, and so the search is gradually refined. As a result, fewer and fewer image points that match the applied search criteria are found, and so the search for further image points terminates after a certain point since no further image points can be ascertained any more. The ascertained image points are then stored in the target set of image points.

According to a further embodiment, provision after ascertaining a certain number of image points using the search parameters can also be made for the test geometry to be ascertained again by virtue of re-fitting the geometric element to the now ascertained image points, as indicated by arrow 120. In this way, the search for further image points converges more and more. The same geometric element that has already been previously fitted to the ascertained image points is preferably used in this case. Only the geometric properties describing the geometric element are fitted to the further ascertained image points.

As soon as the search for further image points has been terminated in step 112, the ascertained result is displayed to the user in step 114. By way of example, provision can be made here for the ascertained image points of the target set of image points to be colored in the visualized object representation so that a user can identify these. By way of example, the corresponding image points can be colored green. Further, provision can be made for image points to be classified on the basis of an appropriate color code as to how well they matched the search criteria. By way of example, image points whose parameters only deviate slightly from the corresponding intended values can be displayed in green. As the parameters of a image point deviate more strongly from the actual intended parameters, an appropriate color coding can be provided, for example, via the color yellow to the color red in the sense of a "status traffic light". Further, provision can be made for the user also to be shown information relating to the fitted geometric element, and so the user is informed, for example, that the algorithm has identified the selected geometry as a cylinder or torus.

From their knowledge of the object, the user can then check whether the correct and complete image points of the corresponding region of the object representation have been ascertained and whether this is based on the correct geometric element. Should this be the case, the user can request, for example, a final fit of the test geometry to the image points by means of a corresponding second user input in step 116, so that, following an appropriate evaluation in step 118 on the basis of corresponding fit parameters, the dimensions of the examined region of the displayed object are ultimately output to said user. Further, the ascertained fit parameters, and also the further geometric properties of the fitted test geometry, can be stored and/or exported. By way of example, this information can be used to create a test plan for subsequent objects with the same nominal geometry.

By contrast, should the user identify that the geometry was not correctly identified or that image points that do not belong to the corresponding region of the object representation have been included, they can communicate this by means of a corresponding second user input. By way of example, the second user input can define a further starting point on the desired surface, whereupon the method jumps back to step 108 and carries out steps 108, 110, 112 and 114 again.

Further, a selection of possible geometric elements can also be shown to the user when the results of the previous analysis are displayed in step 114. In this case, the second user input can further include a selection of the geometric element such that the geometric element to be used is set for the further method. In this case, fitting the geometric element is only carried out for the set geometric element in step 110. The remaining geometric elements are then no longer checked, and so the determination of a deviation of the fitted geometric elements and the comparison thereof can also be dispensed with.

Here, steps 108 to 114 are preferably run through until the user indicates in step 116 that the result of the analysis is correct.

The invention is not restricted to one of the above-described embodiments, but can be modified in many ways.

By way of example, during the course of the first user input in step 106, the user can initially define a slice of the displayed object, within which certain geometries should be searched for. The user can then specify corresponding starting points in the selected slice. Only two-dimensional geometric elements, i.e., lines, curves and circles, are taken into account when determining the test geometry for as long as the user only specifies starting points in the selected two-dimensional slice. However, if the user defines at least one starting point outside the selected slice during the further procedure, only three-dimensional geometric elements, i.e., sphere, cylinder, torus, etc., are considered in the further procedure. The results from previous iterations when determining geometries in the slice can be incorporated into the subsequent determination of three-dimensional test geometries.

As an alternative or in addition thereto, provision can be made for the object to be examined to be presented to a user in a plurality of windows in different views. By way of example, an isometric or freely rotatable three-dimensional view of the object can be presented in a first window, while only a two-dimensional view along a defined slice is presented in another window. The search for corresponding test geometries is restricted to two-dimensional geometric elements for as long as the user only defines starting points in the two-dimensional representation. However, only three-dimensional test geometries are ascertained automatically if the user selects starting points in the three-dimensional view.

All of the features and advantages, including structural details, spatial arrangements and method steps, arising from the claims, the description and the drawing can be essential to the invention, both individually and in the various combinations.

The invention claimed is:

1. A computer-implemented method for identifying a geometry of a portion of an object in a digital representation of the object, the digital representation having a multiplicity of image points, the image points of the digital representation representing at least one material interface of the object, the method including the following steps:

a) ascertaining the object representation,
b) displaying the object representation on at least one display means,
c) receiving at least one first user input, the user input specifying at least one first position in the object representation as a starting point,
d) ascertaining a first set of image points in the surroundings of the starting point, the first set of image points representing the geometry of the portion in the region of the starting point,
e) ascertaining a test geometry on the basis of the first set of image points by fitting at least one geometric element to the image points of the first set of image points,
f) ascertaining a second set of image points in the surroundings of the starting point, the second set of image points representing the geometry of the portion in the region of the test geometry,
g) inserting the second set of image points into at least one target set of image points,
h) displaying the image points of the target set of image points in the object representation on the at least one display means,
i) receiving at least one second user input which indicates whether the displayed image points correctly reproduce the geometry of the portion of the object,
j) should the second user input indicate that the geometry is correctly reproduced, determining at least one dimension of the geometry and outputting the dimension,
k) should the second user input indicate that the geometry is not reproduced correctly, repeat steps c) to i).

2. The method as claimed in claim 1, characterized in that the ascertainment of the first set of image points includes the ascertainment of at least one first parameter of the material interface of the object at the location of the starting point, the respective first parameters of the material interface at the positions of the image points of the first set of image points corresponding to the at least one first parameter at the location of the first image point.

3. The method as claimed in claim 1, characterized in that the ascertainment of the second set of image points includes the ascertainment of reference values of at least one second parameter for image points in the surroundings of the test geometry, the respective second parameters of the image points of the second set of image points corresponding to the ascertained reference values.

4. The method as claimed in claim 1, characterized in that the second user input for indicating that the geometry has not been reproduced correctly specifies at least one further position of the object representation as a starting point.

5. The method as claimed in claim 1, characterized in that the second user input for indicating that the geometry has not been reproduced correctly sets the geometric element such that only the geometric element set by the second user input is taken into account when ascertaining the test geometry.

6. The method as claimed in claim 1, characterized in that the sequence of steps e), f) and g) is run through at least twice within one iteration of steps c) to i).

7. The method as claimed in claim 1, characterized in that the ascertainment of the first set of image points is terminated as soon as the number of image points in the first set of image points reaches a predefined number of image points.

8. The method as claimed in claim 1, characterized in that the ascertainment of the test geometry includes the following steps:

p) ascertaining a geometric element,
q) fitting the geometric element to the image points of the target set of image points by applying a fit method,
r) ascertaining at least one deviation of the fitted geometric element from the image points of the target set of image points, wherein the sequence of steps p) to r) is repeated for at least two geometric elements, wherein the fitted geometric element with the smallest ascertained deviation is set as the test geometry.

9. The method as claimed in claim 8, characterized in that the ascertainment of the deviation of the fitted geometric element includes the following steps:
   u) ascertaining the mean square distance of the fitted geometric element from the target set of image points as position error,
   v) ascertaining the mean square sine of the difference in direction between the normal of the fitted intended geometry and the target set of image points as directional error,
   w) ascertaining the product of position error and directional error,
   x) weighting the product with a defined weighting factor, the weighting factor depending on the geometric element,
   y) defining the weighted product as the deviation of the fitted geometric element.

10. The method as claimed in claim 1, characterized in that image points from the target set of image points are selectively deleted after step g) has been carried out such that the image points remaining in the target set of the image points are distributed uniformly in space.

11. A computer program product comprising instructions able to be executed on a computer, which instructions, when executed on a computer, prompt the computer to carry out the method as claimed in claim 1.

* * * * *